A. LANE & T. MORE.
MILLING LATHE.
APPLICATION FILED AUG. 21, 1916.

1,301,951.

Patented Apr. 29, 1919.
4 SHEETS—SHEET 1.

WITNESSES:
Allan Bennett.
G. W. Thompson.

INVENTORS:
ALFRED LANE.
THOMAS MORE.
Per John E. Walsh
ATTORNEY.

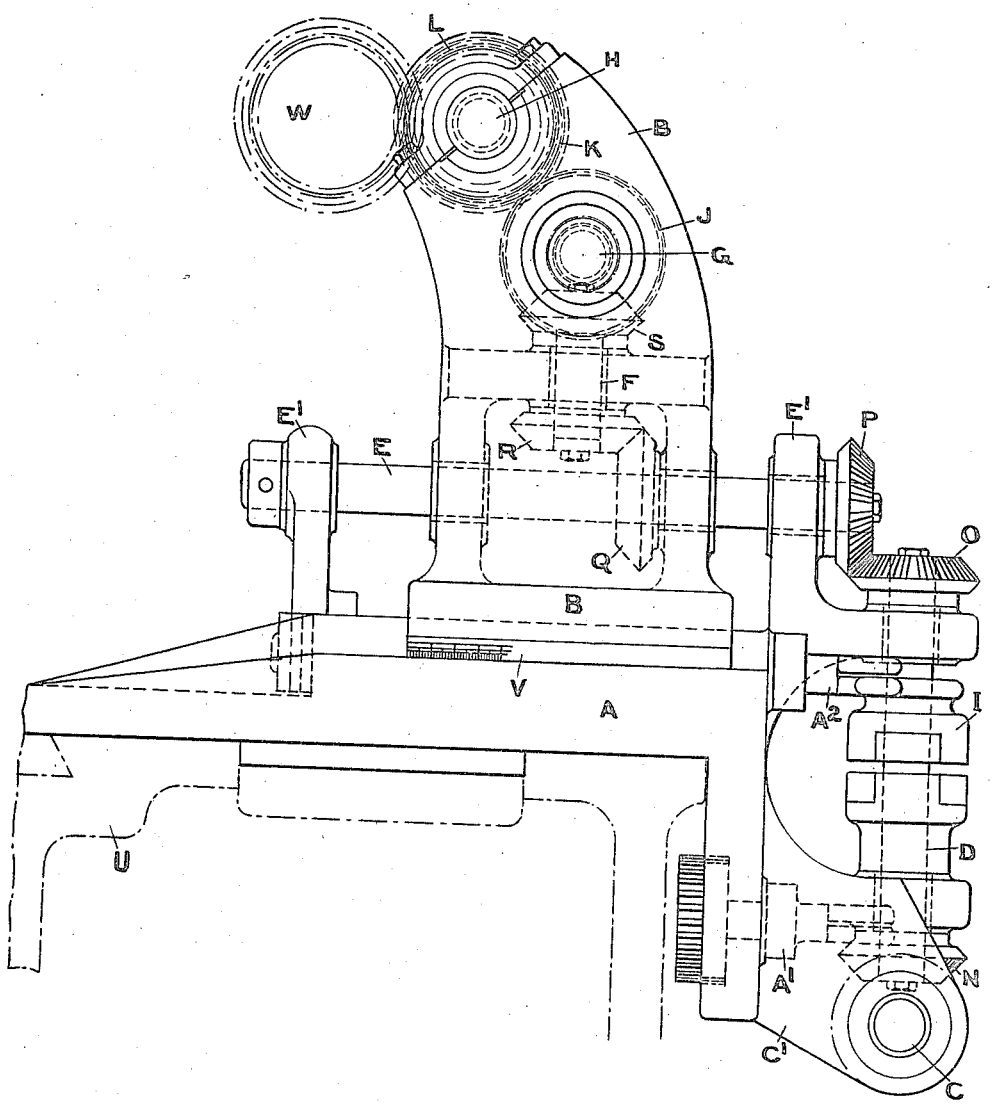

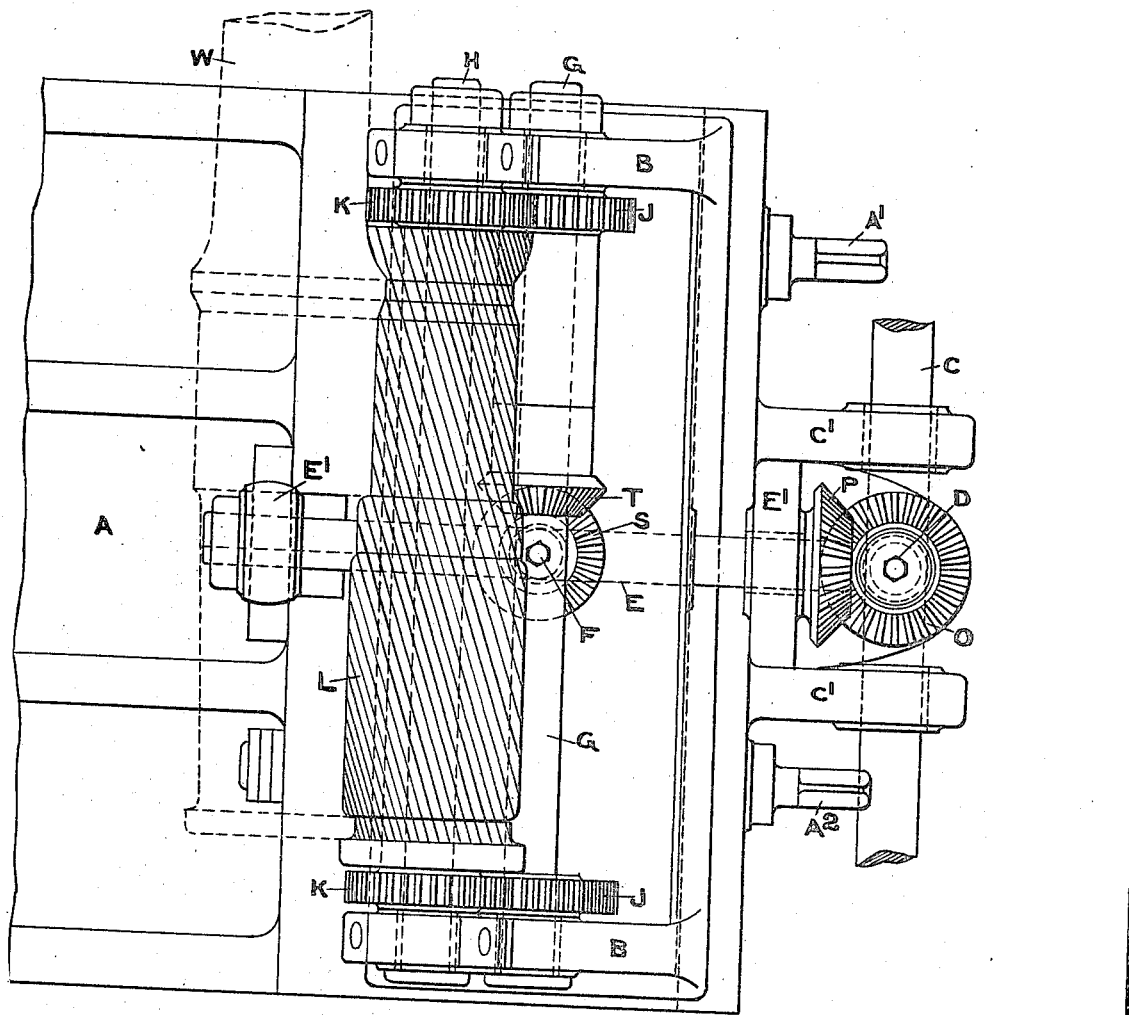

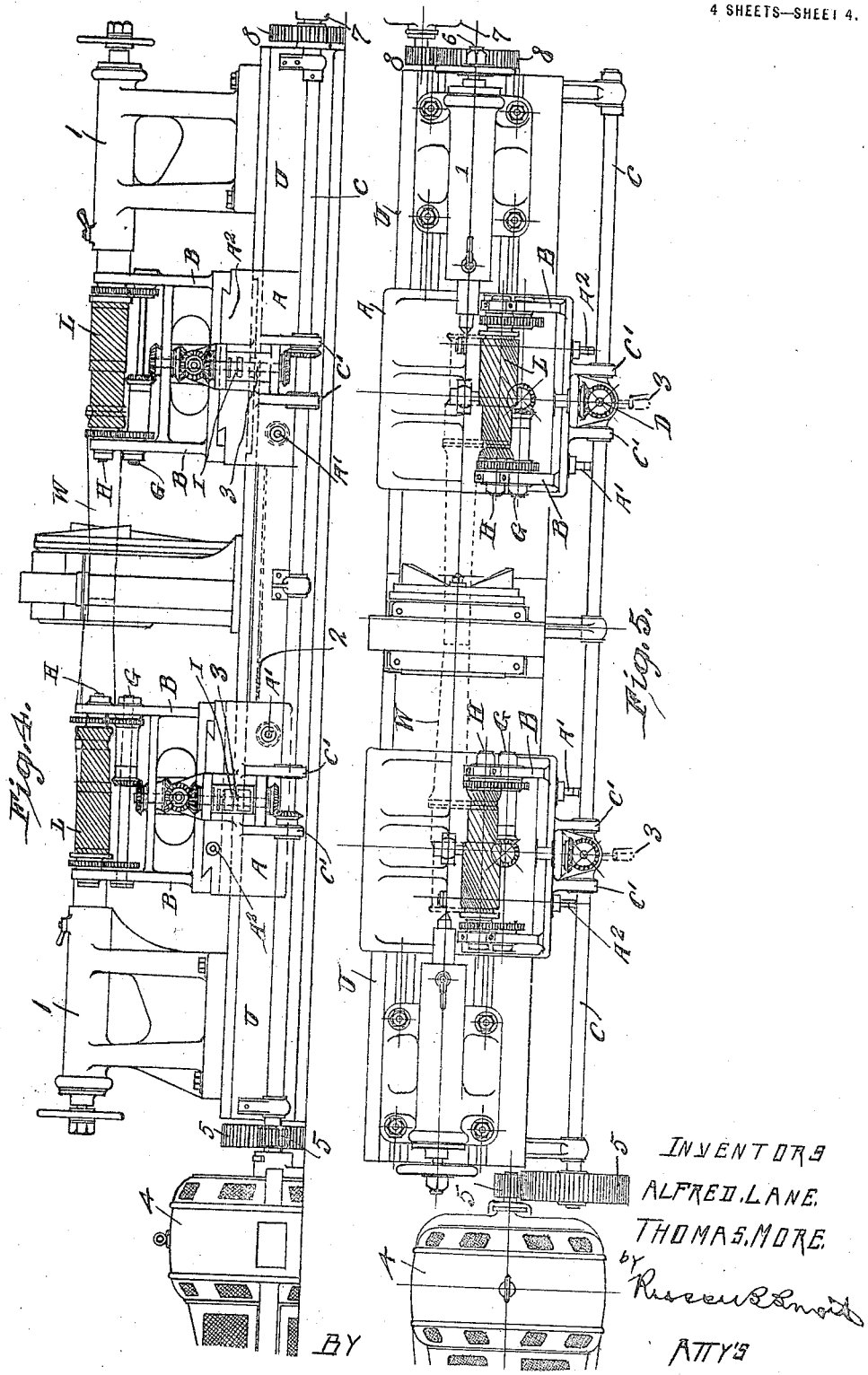

UNITED STATES PATENT OFFICE.

ALFRED LANE, OF RAWDON, AND THOMAS MORE, OF LEEDS, ENGLAND.

MILLING-LATHE.

1,301,951. Specification of Letters Patent. Patented Apr. 29, 1919.

Application filed August 21, 1916. Serial No. 116,195.

*To all whom it may concern:*

Be it known that we, ALFRED LANE and THOMAS MORE, subjects of the King of Great Britain and Ireland, residing, respectively, at Rawdon and at Leeds, both in the county of York, England, have invented a new and useful Improvement in Milling-Lathes, of which the following is a specification.

This invention relates to machines for milling bearings, collars, and wheel seats on axles, more especially for locomotives, coaches, wagons, and like railway vehicles, said machines being characterized by the employment of a pair of built-up milling cutters each forming the composite shape required, instead of ordinary turning tools, and both ends of the axle being done simultaneously.

*Description of drawings.*

Fig. 2 is an end elevation of Fig. 1.

Fig. 3 is a plan of Fig. 2, showing one of the built-up milling cutters in its operative position on one end of the axle.

Fig. 4 is a front elevation (on a smaller scale) of the complete axle-profile milling lathe in accordance with our invention. Fig. 5 is a plan of the same.

Figure 1:
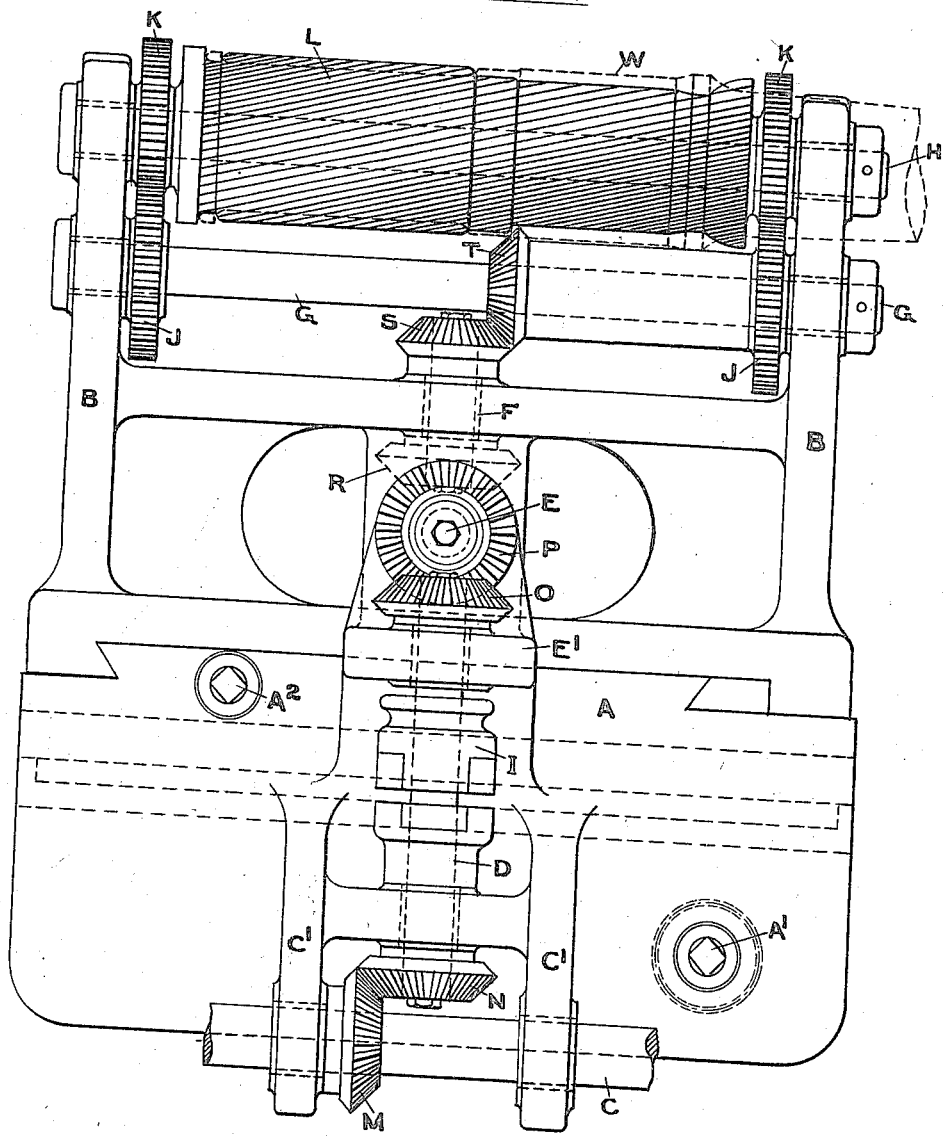
Figure 1 is a partial front elevation of our improved apparatus, showing one of the built-up milling cutters in its operative position, with the adjustable upright supporting pedestal and the base saddle, and the driving gear for actuating the cutter.

According to our said invention the bed-plate U, together with the head-stocks 1 for carrying the axles W between the centers, are of the type ordinarily adopted for axle turning lathes, and are shown in Figs. 4 and 5 of the drawings.

The pair of milling cutters L are separately supported upon base saddles A fitted respectively at each end to the bed-plate U of the machine, provision being made for longitudinal adjustment of each saddle A by rack 2 and external actuating spindle $A^1$, to take in varying lengths of axles W. On the bottom saddles A are fitted upright pedestals B which carry cross shafts E, upper vertical shafts F, intermediate shafts G, and upper terminal shafts H carrying the milling cutters L. These pedestals B are adapted for adjustment in a transverse direction by screw spindles $A^2$, to suit the varying diameters of axles W.

On the said base saddles A projecting brackets $C^1$ are cast to carry the longitudinal side shaft C. On this longitudinal side shaft C are fitted bevel wheels M gearing into corresponding bevel wheels N on the lower ends of lower vertical shafts D. On the upper ends of said lower vertical shafts D are fitted bevel wheels O gearing into corresponding wheels P giving motion to the aforesaid cross shafts E. On these cross shafts E are fitted bevel wheels Q gearing into corresponding wheels R giving motion to the aforesaid upper vertical shafts F. On the upper ends of these upper vertical shafts F are fitted bevel wheels S gearing into corresponding wheels T giving motion to the intermediate shafts G. On these intermediate shafts G are fitted pinion wheels J gearing into corresponding pinion wheels K on the aforesaid upper terminal shafts H and giving motion to the milling cutters L.

The cross shafts E are supported by brackets $E^1$ fixed to the bottom saddles A. Suitable clutches I controlled by levers 3 are provided on each shaft D to disengage the motion of either or both of the milling cutters L without stopping the machine. A graduated scale V is provided for the adjustment of the milling cutters L.

The longitudinal side shaft C extends along the machine throughout its entire length, and is coupled to a variable speed motor 4 by gearing 5 to give the suitable speeds to the milling cutters L.

The motion to the axle W will be arranged through the center of the bed-plate, by a shaft 6 running longitudinally, coupled to a variable speed motor 7 by toothed gearing 8 or worm gearing, which will also constitute the feed and drive of the axle.

We claim:

A milling lathe for cutting bearings, collars, and wheel seats on an axle, comprising in combination, a bed-plate U, front and back head-stocks 1 carrying said axle, a variable speed motor 7, a longitudinal feed shaft 6 coupled to said motor, a pair of milling cutters L built up to the required composite formation and located at opposite ends of the machine so as to be operative respectively on opposite ends of the axle, a pair of base saddles A and pedestals B adapted to support the respective milling cutters and their operating mechanism, means for longitudinal adjustment of each said base saddle upon the bed-plate, means for transverse adjustment of each said pedestal upon its respective base saddle, a variable speed motor 4, a longitudinal side shaft C coupled to said motor and supported in bearings carried by said base saddles, shafts and gearing supported by said base saddles and pedestals for separately transmitting rotary movement from said side shaft to the respective milling cutters, and clutch mechanism I, 3 for separately disengaging either or both of said milling cutters, whereby said pair of milling cutters are operative either simultaneuously or otherwise, substantially as herein set forth.

ALFRED LANE.
THOMAS MORE.

Witnesses:
JOHN E. WALSH,
ALLAN BENNETT.